United States Patent Office 3,746,745
Patented July 17, 1973

3,746,745
SYNTHESIS OF HEXAMETHYL MELLITATE
Robert J. Crawford, Wyoming, Ohio, assignor to The Procter & Gamble Company, Cincinnati, Ohio
No Drawing. Filed Mar. 31, 1971, Ser. No. 130,023
Int. Cl. C07c 69/76
U.S. Cl. 260—475 R       8 Claims

ABSTRACT OF THE DISCLOSURE

An improved process for synthesizing the hexamethyl ester of mellitic acid by the trimerization of dimethyl acetylenedicarboxylate which maximizes product yield and minimizes costly reaction time and need for expensive equipment.

BACKGROUND OF THE INVENTION

(1) Field of the invention

This invention relates to an improved four-step process for the synthesis and recovery of the hexamethyl ester of mellitic acid. Such a compound has the formula $$C_6(COOCH_3)_6$$

and is an intermediate in the production of mellitic acid (benzenehexacarboxylic acid). Mellitic acid, in turn, is useful as a builder and sequestering agent in detergent compositions. The process steps involve the pyridine-catalyzed trimerization of dimethyl acetylene-dicarboxylate followed by selective precipitation of the resulting hexamethyl mellitate product.

(2) Description of the prior art

Production of mellitic acid intermediates (substituted benzene compounds) by trimerization of various acetylenic monomers is well-known in the art. Such reactions, for example, have been disclosed by Kleinschmidt, U.S. Pat. 2,542,417, Feb. 20, 1951 and Martella and Kaska, Tetrahedron Letters, p. 4889 (1968, Pergamon Press).

From the standpoint of mellitic acid synthesis, highly preferred monomers are the acetylenedicarboxylates since atfer trimerization occurs, it is not necessary to oxidize substituents on the resulting benzene structure to carboxylic acid groups. Almost all of the prior art acetylenedicarboxylate trimerization processes, however, require relatively large amounts of expensive complexed-metallic catalysts to produce suitable yields of the substituted benzene product. Although attempts have been made to eliminate the need for such metallic catalysts in acetylenedicarboxylate trimerization [See Diels et al. Ann. 498, p. 16 (1932) and Diels, Chem. Ber. 75, p. 1452 (1942)], yields higher than about 20% have never before been obtained thereby.

Accordingly, it is an object of the present invention to provide a means of synthesizing in commercially feasible yields a substituted benzene compound which does not require an expensive, time-consuming oxidation step for its conversion to mellitic acid. It is a further object of the present invention to produce such a mellitic acid intermediate starting from a commercially available monomer without the employment of expensive metallic catalysts. It is a further object of the present invention to provide a process for the synthesis of hexamethyl mellitate which embodies an economical and effective means of recovering the desired product from the reaction solution.

It has now been discovered that by employing a particular combination of steps for the trimerization of dimethyl acetylenedicarboxylate using pyridine or substituted pyridine catalyst and an acetic acid solvent, and a novel separation step to recover the hexamethyl mellitate trimerization product, these objectives can be accomplished and valuable mellitic acid intermediates can be produced more economically and more efficiently than by prior art processes.

SUMMARY OF THE INVENTION

An improved process for the synthesis of the hexamethyl ester of mellitic acid is provided. The process comprises the steps of: (a) dissolving dimethyl acetylenedicarboxylate monomer in deoxygenated glacial acetic acid; (b) slowly adding pyridine or substituted pyridine catalyst to the solution of Step (a) until the mixture contains a monomer to catalyst molar ratio of from about 15:1 to 1:1, said addition being carried out in an oxygen-free atmosphere while maintaining the temperature of the solution below 50° C.; (c) heating the reaction mixture under oxygen-free conditions to maintain its temperature between 50° C. and 118° C. for a period of from about 30 minutes to 180 minutes; and subsequently (d) adding to the reaction mixture of Step (c) enough water to at least double the solution volume, thereby precipitating the hexamethyl ester of mellitic acid.

DESCRIPTION OF THE DEVELOPMENT

At this juncture a detailed description of each process step will be provided.

(A) Dissolution of the monomer

The monomer employed for the improved process of the instant invention is dimethyl acetylenedicarboxylate having the formula:

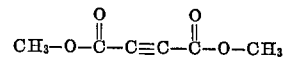

This compound is available commercially or can be prepared from commercially available fumaric acid according to a process outlined in Organic Syntheses Collective volumee IV, (Wiley & Sons, 1963) at p. 329.

The liquid dicarboxylate monomer is dissolved in glacial acetic acid for trimerization. It has been found that glacial acetic acid is the only solvent which will, in combination with a pyridine or substituted pyridine catalyst, foster a trimerization reaction of the particular monomer employed. The concentration of the monomer in the acetic acid solution is not critical. Very high monomer concentrations (approaching 100% monomer) enhance trimerization efficiency but such solutions are hard to maintain at the essential temperature conditions of the subsequent trimerization step. A small monomer concentration in the glacial acetic acid, on the other hand, results in much material being processed with minimal production of hexamethyl mellitate. A monomer concentration of from about 30% to 50% by weight is preferred.

It is essential that the monomer-acetic acid solution be essentially completely deoxygenated prior to catalyst addition. Oxygen interferes with trimerization efficiency and also seems to be responsible for sudden undesirable heat evolution. Deoxygenation is accomplished by bubbling an inert gas through the monomer-acetic acid solution. Suitable inert gases include nitrogen or any of the rare gases, e.g., argon. For the purpose of this invention "oxygen-free" conditions are obtained by rigorously excluding oxygen from the reaction.

(B) Catalyst addition—initial trimerization

In an acetic acid solvent, the trimerization of dimethyl acetylenedicarboxylate monomer utilized in the instant invention is catalyzed by pyridine or substituted pyridine according to the following reaction:

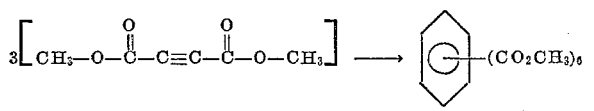

The term "substituted pyridine" for the purpose of the instant invention refers to compounds having one, two or three lower alkyl (i.e. $C_1$–$C_4$) groups placed on various carbon atoms in the pyridine ring structure but does not include compounds which have substituents on both of the two carbon atoms which are adjacent to the nitrogen atom in the ring structure. Operable catalysts thus include pyridine, 2,3-dimethyl pyridine, 5-ethyl pyridine, 3,4,5-trimethyl pyridine, 2-methyl-3-ethyl-4-propyl pyridine 2-ethyl-5-butyl pyridine and 4-methyl pyridine. Pyridine is the preferred catalyst.

By carrying out the above trimerization step utilizing the specific procedures of the instant invention, yields of the ester product much higher than ever before attainable can be obtained.

Trimerization is initiated by the gradual addition of pyridine or substituted pyridine to the monomer-acetic acid solution formed by Step (a). The amount of catalyst affects the yield of the mellitate ester. Hence, pyridine or substituted pyridine should be added until there is a monomer to catalyst molar ratio in the reaction solution of from about 15:1 to 1:1. Ratios above 15:1 result in too little pyridine or substituted pyridine to effectively catalyze trimerization. Ratios below 1:1 are wasteful of the pyridine or substituted pyridine catalyst. A preferred monomer to catalyst molar ratio range is from about 3:1 to 1.5:1.

During the addition of the catalyst, the reaction solution temperature is kept below 50° C. Since some heat evolution occurs during catalyst addition, it is necessary to employ apparatus which will keep the reaction solution below the specified 50° C. maximum temperature. Preferably the reaction mixture is maintained at about room temperature during this step of the process.

As with Step (a) above, employment of deoxygenated reactants and solvents as well as maintenance of an oxygen-free atmosphere is essential from the standpoint of both trimerization efficiency and temperautre control. Also as before, such oxygen-free conditions are maintained by employing deoxygenated pyridine or substituted pyridine and by continuing to maintain an inert atmosphere above the reaction mixture during catalyst addition.

(C) Trimerization completion

Addition of the catalyst during Step (b) causes some trimerization to begin immediately. However, at low temperatures of the catalyst addition step, trimerization is far from complete. The reaction mixture must be heated to complete the trimerization. Thus, after addition of the pyridine or substituted pyridine catalyst, the reaction mixture is heated to a temperature of from about 50° C. to about 118° C. Below 50° C. trimerization will only proceed as far as it did during the catalyst addition step. Above 118° C. the mixture boils. A preferred trimerization completion temperature is from about 70° C. to 80° C.

The reaction mixture must be maintained at this higher temperature for a period of about 30 to 180 minutes. Trimerization times shorter than 30 minutes do not afford opportunity for reaction completion. Reaction times longer than 180 minutes serve no purpose since all trimerization has by then occurred. A preferred reaction time for the trimerization completion step is from about 100 to 160 minutes. As before, the reaction solution and atmosphere should be kept oxygen-free.

The particular combination of Steps (b) and (c), i.e. keeping the reaction solution relatively cool during catalyst addition and subsequently heating the solution to complete the trimerization is essential for the high yield production of hexamethyl mellitate. Allowing the reaction solution temperature to rise from its own heat evolution during catalyst addition seems to impair the efficiency of the catalyzed trimerization.

(D) Hexamethyl mellitate separation

At the completion of Step (c) the reaction solution is a mixture of catalyst, acetic acid, reaction by-products and the dissolved product ester, hexamethyl mellitate. It has been discovered that the desired product ester can be made to precipitate from this mixture simply by the addition of water. Water will readily dissolve the catalyst, acetic acid and most of the reaciton by-products while hexamethyl mellitate is insoluble in the resulting solution. Adequate precipitation occurs when the volume of the reaction mixture of Step (a) is at least doubled by the addition of water. Water addition to approximately quadruple the original volume is preferred. The precipitate produced is then collected by filtration and may be purified by any standard recrystallization and drying procedure. Overall hexamethyl mellitate yields can be as high as 77% crude product precipitating from the solution of Step (d). After purification by recrystallization, ester yields of 70% are obtained. The hexamethyl mellitate can be converted to the mellitic acid salt by conventional NaOH saponification procedures.

The improved process of the instant invention is illustrated by the following example:

EXAMPLE

A solution of 150.0 g. (1.056 moles) of dimethyl acetylenedicarboxylate in 216 ml. of glacial acetic acid (40% by weight) was placed in a one-liter round-bottom flask fitted with a mechanical stirrer, reflux condenser, thermometer, and addition funnel. The mixture was deoxygenated by bubbling with argon for 30 minutes. To the stirred solution under argon atmosphere was added dropwise 42.6 ml. (0.53 mole) of deoxygenated pyridine (monomer to catalyst ratio of 2:1) over a period of 40 minutes. During the addition the flask was placed in a cool water bath to maintain the solution temperature below 20° C. The cooling bath was removed and, within 10 minutes, the solution temperature increased spontaneously to 40° C. and the color darkened. The reaction mixture then was heated to 70° C. over a period of 30 minutes by application of a heating bath, and the temperature was maintained between 70–80° by alternate application of heating and cooling baths for 130 minutes. (On occasions, during the period after addition of the pyridine or during heating, the reaction exhibited a violent exotherm which resulted in rapid heating of the solution to reflux temperature. It is imperative that the solution temperature be monitored carefully, that oxygen-free conditions be maintained and that adequate cooling facilities be provided to counteract any sudden rise in temperature.)

The reaction mixture was allowed to cool slowly to room temperature (crystal formation observed) and then was poured with vigorous stirring into 2.25 l. of cold water. The precipitated solid was collected by suction filtration, washed with four 100 ml. portions of a water, aspirated for 45 minutes on the filter funnel, and then vacuum dried overnight (25° C., 0.1 mm.) to afford 112.4 g. of brown powder. This material was combined with 38.5 g. additional product obtained from 50.0 g. of dimethyl acetylenedicarboxylate by an identical procedure. The combined samples were recrystallized to yield, after vacuum drying, 139.2 g. (70% based on 200.0 g. of dimethyl acetylenedicarboxylate) of hexamethyl mellitate as fine, off-white needles having a melting point of 187.5–188.5° C.

Substantially similar yields of hexamethyl mellitate are obtained when a monomer to catalyst molar ratio of 15:1 is employed and the reaction solution temperature is maintained at 45° C. throughout pyridine addition.

Likewise, substantially similar yields of hexamethyl mellitate are obtained when the reaction mixture is heated to 115° C. for 30 minutes to complete trimerization and when the hexamethyl mellitate is separated by the addition of one-half liter of water.

Likewise, substantially similar yields of hexamethyl mellitate are obtained when the catalyst employed is 2,3-dimethyl pyridine or 2-ethyl-5-butyl pyridine.

What is calimed is:

1. An improved process for the synthesis of the hexamethyl ester of mellitic acid comprising the steps of:
   (a) dissolving dimethyl acetylenedicarboxylate monomer in deoxygenated glacial acetic acid;
   (b) slowly adding a catalyst having the formula

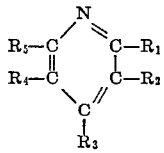

wherein $R_1$, $R_2$, $R_3$ $R_4$ and $R_5$ are either hydrogen or lower alkyl but no more than three of the R groups are lower alkyl and $R_1$ and $R_5$ cannot both be lower alkyl, to the solution of Step (a) until the mixture contains a monomer to catalyst molar ratio of from about 15:1 to 1:1, said addition being carried out in an oxygen-free atmosphere while maintaining the temperature of the solution below 50° C.;
   (c) heating the reation mixture under oxygen-free conditions to maintain temperature between 50° C. and 118° C. for a period of from about 30 minutes to 180 minutes; and subsequently
   (d) adding to the reaction mixture of Step (c) enough water to at least double the solution volume, thereby precipitating the hexamethyl ester of mellitic acid.

2. A process according to claim 1 wherein the catalyst empolyed is pyridine.

3. A process according to claim 2 wherein a monomer to catalyst molar ratio of about 3:1 to 1.5:1 is employed.

4. A process according to claim 3 wherein the reaction mixture temperature during Step (b) is maintained between about 15° C. to about 25° C.

5. A process according to claim 3 wherein the reaction mixture temperature is maintained between about 70° C. and 80° C. during Step (c).

6. A process according to claim 5 wherein the reaction mixture temperature during Step (b) is maintained between 15° C. and 25° C.

7. A process according to claim 6 wherein during Step (c) a reaction mixture temperature between about 70° C. and 80° C. is maintained for at least 130 minutes.

8. A process according to claim 7 wherein in Step (d) enough water is added to approximately quadruple the reaction solution volume.

References Cited

Diels et al., Ann. 498 p. 16 (1932).
Diels, Chem. Ber. 75, pp. 1452–1467 (1942).

LORRAINE A. WEINBERGER, Primary Examiner

E. J. SKELLY, Assistant Examiner